(12) United States Patent
Sugiyama

(10) Patent No.: US 10,330,898 B2
(45) Date of Patent: Jun. 25, 2019

(54) IMAGING OPTICAL SYSTEM

(71) Applicant: CANON KABUSHIKI KAISHA, Tokyo (JP)

(72) Inventor: Takayuki Sugiyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/478,454

(22) Filed: Apr. 4, 2017

(65) Prior Publication Data

US 2017/0293119 A1    Oct. 12, 2017

(30) Foreign Application Priority Data

Apr. 7, 2016 (JP) ................. 2016-077094

(51) Int. Cl.

| G02B 13/18 | (2006.01) |
|---|---|
| G02B 9/34 | (2006.01) |
| G02B 9/60 | (2006.01) |
| G02B 26/08 | (2006.01) |
| G02B 26/10 | (2006.01) |
| G02B 13/16 | (2006.01) |
| H04N 1/028 | (2006.01) |

(Continued)

(52) U.S. Cl.
CPC ............ *G02B 13/18* (2013.01); *G02B 3/02* (2013.01); *G02B 9/34* (2013.01); *G02B 9/60* (2013.01); *G02B 13/16* (2013.01); *G02B 13/24* (2013.01); *G02B 26/0875* (2013.01); *G02B 26/101* (2013.01); *H04N 1/02815* (2013.01)

(58) Field of Classification Search
CPC .. G02B 13/18; G02B 13/003; G02B 13/0035; G02B 13/004; G02B 13/0045; G02B 9/04; G02B 9/08; G02B 9/12; G02B 9/34; G02B 9/60; G02B 9/62; G02B 9/64; G02B 26/101; G02B 26/0875
See application file for complete search history.

(56) References Cited

U.S. PATENT DOCUMENTS

| 6,614,599 B1 * | 9/2003 | Watanabe ............ G02B 15/177 359/680 |
|---|---|---|
| 6,905,462 B1 * | 6/2005 | Homma .................. G02B 9/12 348/340 |

(Continued)

FOREIGN PATENT DOCUMENTS

| JP | H05103271 A | 4/1993 |
|---|---|---|
| JP | 2008065234 A | 3/2008 |

(Continued)

*Primary Examiner* — Jordan M Schwartz
(74) *Attorney, Agent, or Firm* — Rossi, Kimms & McDowell LLP

(57) ABSTRACT

An imaging optical system of the present invention includes first and second optical elements arranged in order from an object side and an aperture stop. Each of the first and second optical elements includes an aspherical surface which is rotationally asymmetric with respect to an optical axis. A curvature of the aspherical surface in a first cross section including the optical axis changes from the optical axis in a first direction perpendicular to the first cross section. A total length of the imaging optical system, a distance between the aspherical surface closest to the object side and the aperture stop, and Abbe numbers of the first and second optical elements are appropriately set.

14 Claims, 11 Drawing Sheets

(51) Int. Cl.
*G02B 13/24* (2006.01)
*G02B 3/02* (2006.01)

(56) References Cited

U.S. PATENT DOCUMENTS

| | | | |
|---|---|---|---|
| 7,397,620 B2 | 7/2008 | Hayashide et al. | |
| 2002/0015114 A1* | 2/2002 | Okuyama | G02B 27/0172 349/5 |
| 2009/0290225 A1* | 11/2009 | Asakura | G02B 23/145 359/646 |
| 2010/0060992 A1* | 3/2010 | Hirose | G02B 13/04 359/671 |
| 2011/0299049 A1* | 12/2011 | Yatsu | G02B 13/18 353/98 |
| 2012/0127589 A1* | 5/2012 | Pao | G02B 13/0045 359/689 |
| 2013/0010372 A1* | 1/2013 | Chou | G02B 15/177 359/689 |
| 2013/0057964 A1* | 3/2013 | Chou | G02B 15/177 359/680 |
| 2016/0062078 A1* | 3/2016 | Huang | G02B 13/18 359/714 |
| 2017/0285299 A1* | 10/2017 | Chen | G02B 9/64 |
| 2018/0042461 A1* | 2/2018 | Togino | A61B 1/00096 |

FOREIGN PATENT DOCUMENTS

| | | |
|---|---|---|
| JP | 2008292800 A | 12/2008 |
| JP | 2013109268 A | 6/2013 |

* cited by examiner

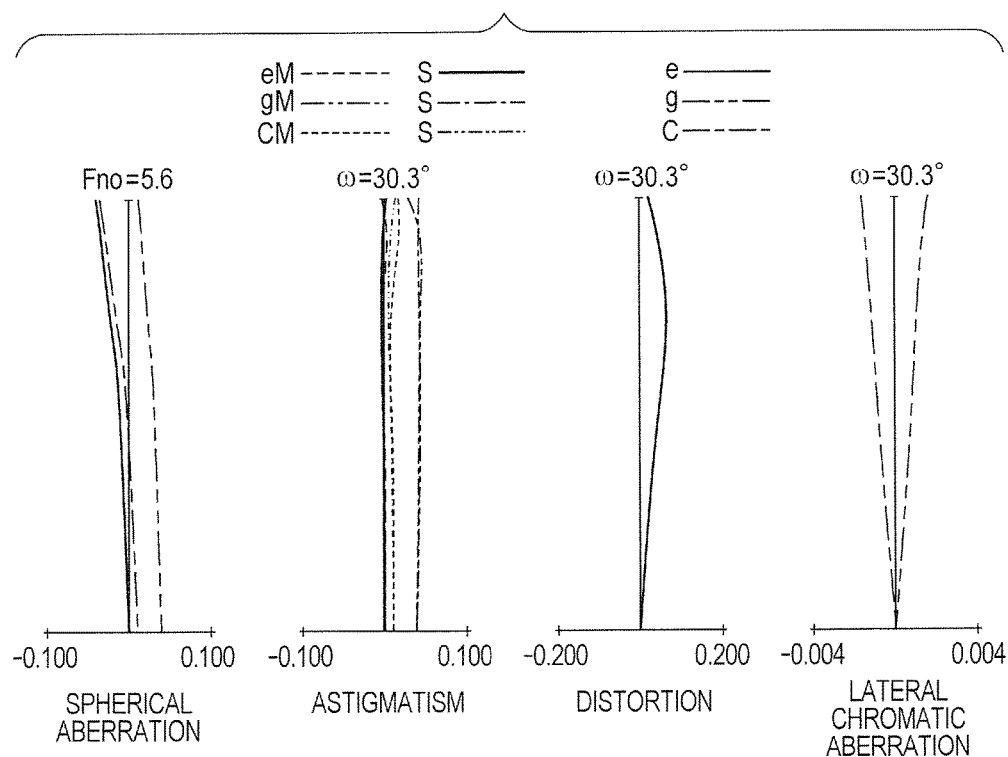
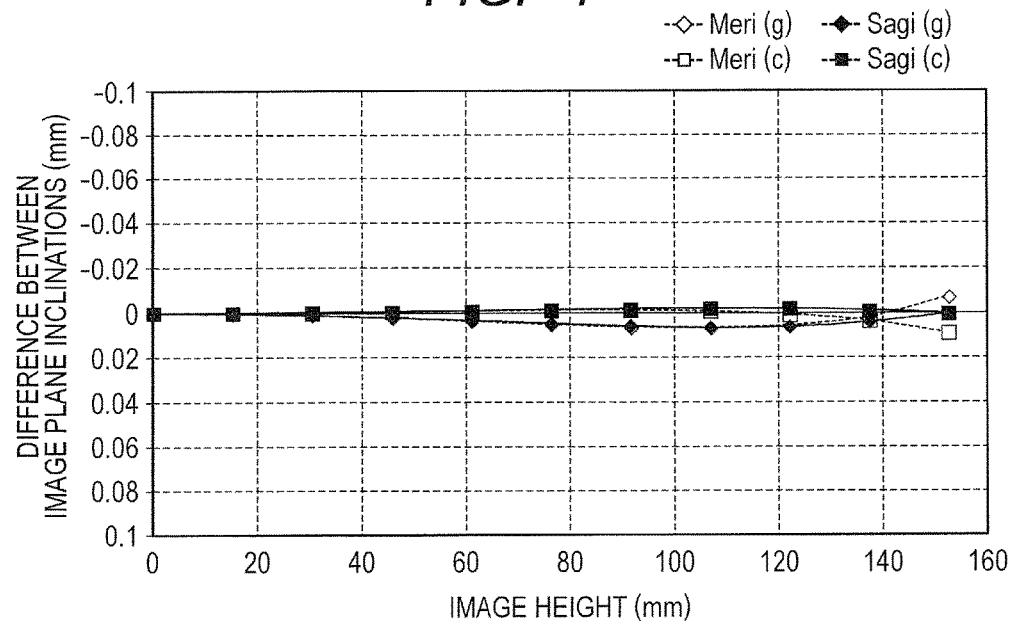

IMAGING OPTICAL SYSTEM

BACKGROUND OF THE INVENTION

Field of the Invention

The present invention relates to an imaging optical system, and particularly to an imaging optical system to be preferably used as a scanning lens unit configured to form an image of an original on reading unit using light fluxes.

Description of the Related Art

In recent years, there has been a demand for downsize of an image reading apparatus configured to read image information of an original. To meet the demand, it is important to downsize a scanning lens unit configured to form an image of an original on reading unit using light fluxes, and accordingly downsize a carriage configured to house the scanning lens unit.

Japanese Patent Application Laid-Open No. 2008-65234 discloses an imaging optical system which, for the purpose of downsizing the carriage, is equipped with a special aspherical lens having an aspherical lens surface (hereinafter also referred to as a "special aspherical surface") whose surface profile is rotationally asymmetric with respect to the optical axis, and whose curvature in the sub-scanning cross section changes from the optical axis in the main-scanning direction.

Using this special aspherical surface, the imaging optical system disclosed in Japanese Patent Application Laid-Open No. 2008-65234 effectively reduces both the field curvature aberration, and the so-called sub-scanning magnification deviation, namely a variation of magnification in the sub-scanning direction in a range of from the on-axis image height to the off-axis image height. Thereby, Japanese Patent Application Laid-Open No. 2008-65234 downsizes the imaging optical system, and accordingly the carriage, by decreasing the object-to-image distance and the optical path length itself while allowing widening the angle of view.

However, the imaging optical system disclosed in Japanese Patent Application Laid-Open No. 2008-65234 has been made without sufficient consideration of the chromatic aberration due to differences between image plane inclinations of red, green and blue colors, and therefore is not able to reduce the chromatic aberration in a satisfactory manner.

SUMMARY OF THE INVENTION

With the above-mentioned problem taken into consideration, an object of the present invention is to provide an imaging optical system which is downsized and made capable of, in a satisfactory manner, reducing the field curvature aberration, the sub-scanning magnification deviation, and the chromatic aberration caused by the differences between image plane inclinations of colors.

An imaging optical system according to the present invention includes first and second optical elements arranged in order from an object side and an aperture stop. Each of the first and second optical elements includes an aspherical surface which is rotationally asymmetric with respect to an optical axis. A curvature of the aspherical surface in a first cross section including the optical axis changes from the optical axis in a first direction perpendicular to the first cross section. The imaging optical system according to the present invention satisfies the following conditions:

$$0.4 \leq dst/Td \leq 1.0, \text{ and}$$

$$|\nu st1 - \nu st2| \geq 20,$$

where Td represents a total length of the imaging optical system, dst represents a distance between the aspherical surface closest to the object side and the aperture stop, $\nu st1$ represents an Abbe number of the first optical element, and $\nu st2$ represents an Abbe number of the second optical element.

Further features of the present invention will become apparent from the following description of exemplary embodiments with reference to the attached drawings.

BRIEF DESCRIPTION OF THE DRAWINGS

FIG. 3 is a diagram illustrating various aberrations of the scanning lens unit of Numerical Example 1 of the first embodiment.

FIG. 4 is a diagram illustrating image-height dependencies of differences between image plane inclinations of colors in the scanning lens unit of Numerical Example 1 of the first embodiment.

DESCRIPTION OF THE EMBODIMENTS

Preferred embodiments of the present invention will now be described in detail in accordance with the accompanying drawings. It should be noted that a representation of components of an imaging optical system of the embodiments in each accompanying drawing may involve a scale which is different from an actual one for the purpose of facilitating the understanding of the embodiments.

The imaging optical system of the embodiments is preferably used as a scanning lens unit which is installed particularly in an image reading apparatus such as an image scanner, a copying machine or a facsimile machine, and which guides (collects) light fluxes from an original to light receiving surfaces of reading unit (a light receiving unit)

First Embodiment

Figure 1:
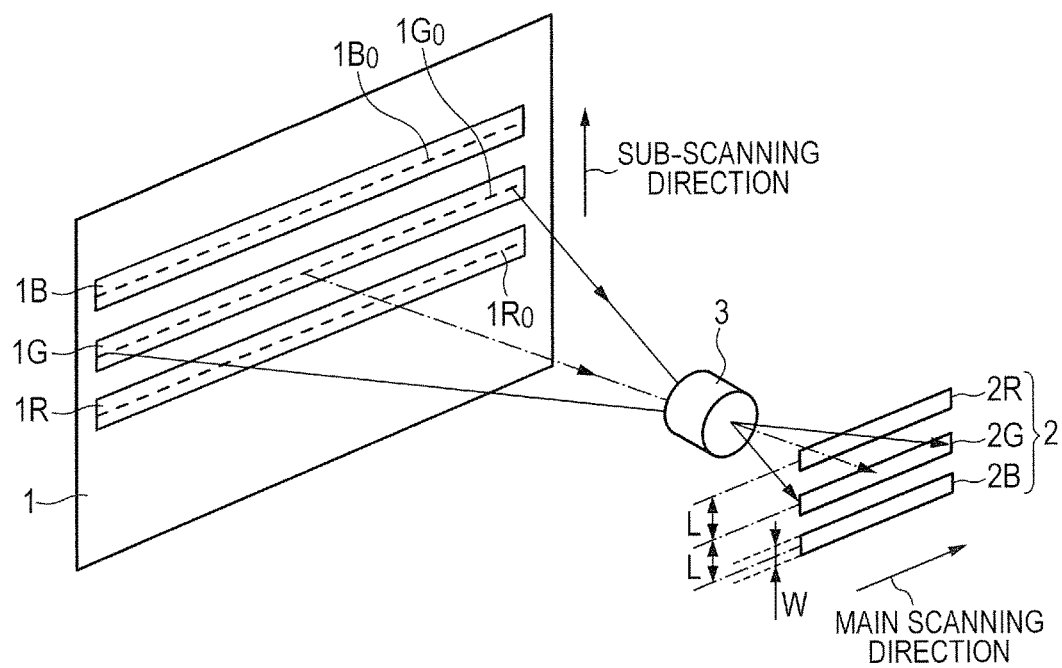
FIG. 1 is a diagram illustrating how a scanning lens unit scans an image in a first embodiment of the present invention.

FIG. 1 is a diagram illustrating how a scanning lens unit (imaging optical system) 3 scans an image in a first embodiment.

A color image (image information) is formed on an original 1. Reference signs 1R, 1G, and 1B on the original 1 respectively represent scanned areas from which the scanning lens unit 3 scans the image information and forms the corresponding images on three line sensors 2R, 2G, and 2B provided to reading unit 2. In other words, the scanned areas 1R, 1G, and 1B are conjugate with the line sensors 2R, 2G, and 2B, respectively.

An array direction of scanning pixels in the line sensors 2R, 2G, and 2B, namely a longitudinal direction, will be hereinafter referred to as a main scanning direction (first direction). A direction perpendicular to the optical axis direction and the main scanning direction will be hereinafter referred to as a sub-scanning direction.

In the reading unit 2, the three monolithic line sensors 2R, 2G, and 2B are arranged in parallel to one another on the same board, albeit not illustrated. A CCD or CMOS sensor is used as each line sensor.

Color filters, albeit not illustrated, associated with the color lights such as red (R), green (G) and blue (B) light are provided on the light receiving surfaces of the line sensors 2R, 2G, and 2B.

The line sensors 2R, 2G, and 2B each have a width W in a short-length direction (sub-scanning direction). The line sensors 2R, 2G, and 2B are spaced out with a line interval L, in the sub-scanning direction, between each neighboring two of the line sensors.

The line sensors 2R, 2G, and 2B read the image information on the colors from the scanned areas 1R, 1G, and 1B on the original 1 using a line sequential method while the original 1 is being scanned (moved) in the sub-scanning direction.

The scanning lens unit 3 (imaging optical system) guides (collects) the light fluxes, based on the image information on the original 1, onto the light receiving surfaces of the reading unit 2.

The scanning lens unit 3 of the embodiment includes optical elements (special aspherical lenses) each having an optical surface (lens surface) whose sagittal curvature continuously changes in the main scanning direction from an on-axis image height to a most off-axis image height, and whose surface profile is rotationally asymmetric with respect to the optical axis.

Next, descriptions will be provided for Numerical Examples 1 to 4 of the scanning lens unit 3 of the embodiment.

Figure 2:
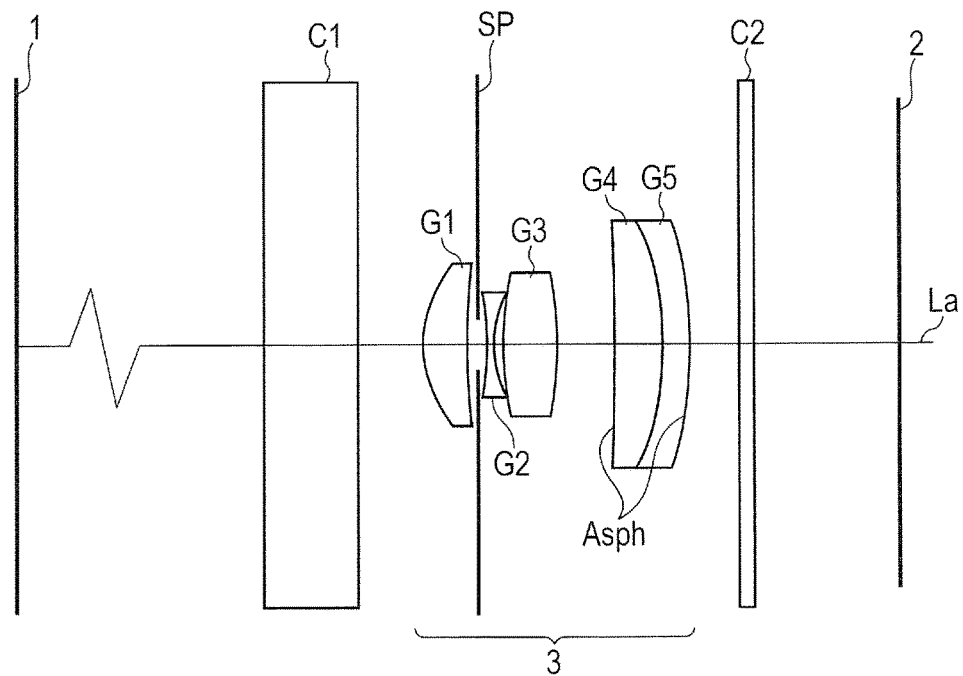
FIG. 2 is a cross-sectional view of lenses in the scanning lens unit of Numerical Example 1 of the first embodiment.
Figure 5:
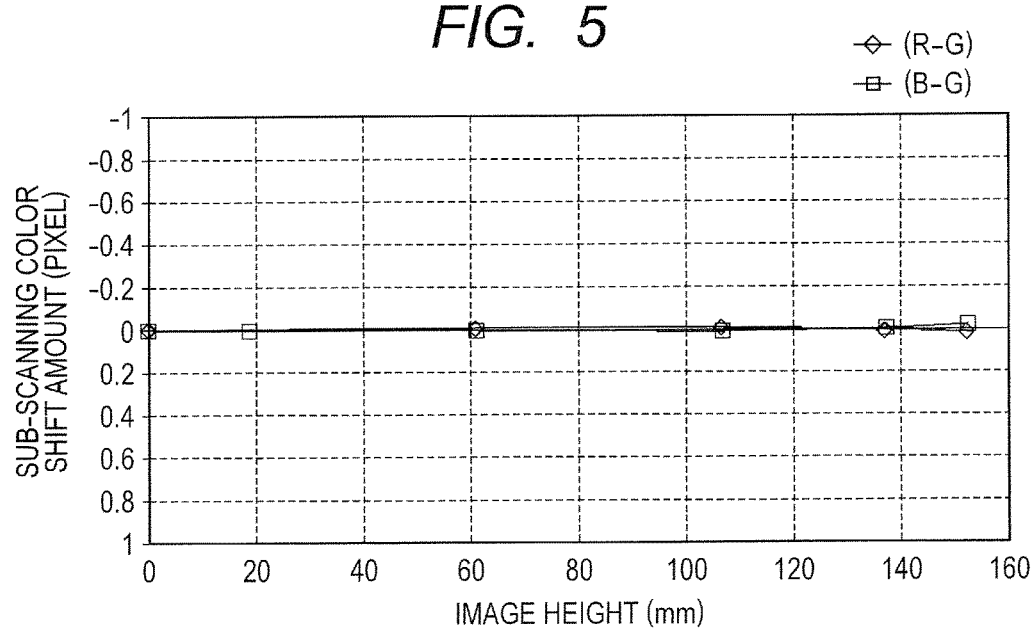
FIG. 5 is a diagram illustrating image-height dependencies of the sub-scanning color shift amounts between colors in the scanning lens unit of Numerical Example 1 of the first embodiment.

FIG. 2 is a cross-sectional view of lenses in the scanning lens unit 3 in Numerical Example 1. FIG. 3 illustrates various aberrations of the scanning lens unit 3 in Numerical Example 1. FIG. 4 illustrates image-height dependencies of differences between an image plane inclination of each of R and B colors and that of G color in the scanning lens unit 3 in Numerical Example 1. FIG. 5 illustrates image-height dependencies of the sub-scanning color shift amounts of R and B colors from G color in the scanning lens unit 3 in Numerical Example 1.

Figure 6:
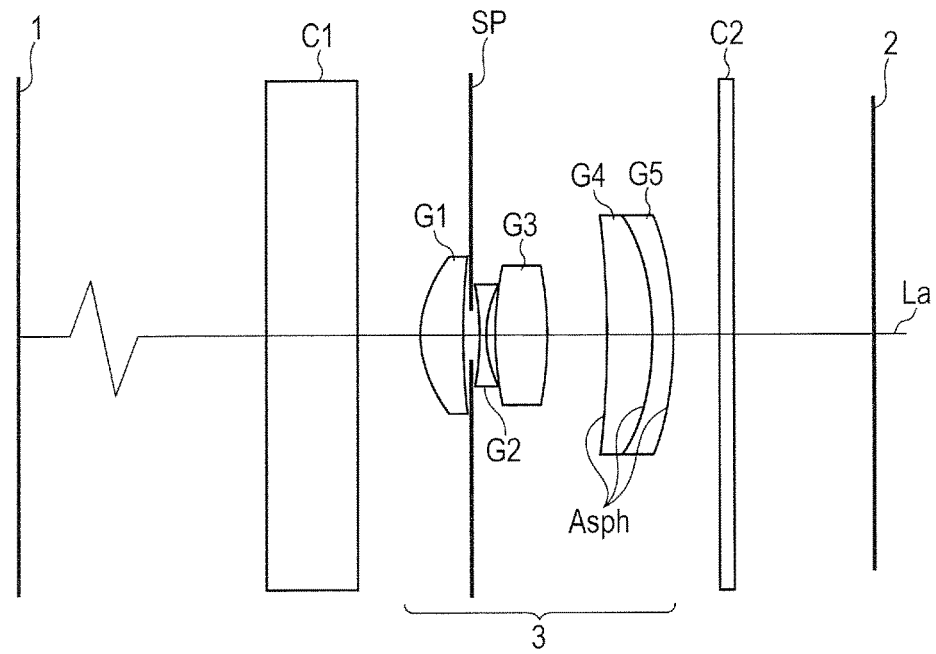
FIG. 6 is a cross-sectional view of lenses in the scanning lens unit of Numerical Example 2 of the first embodiment.
Figure 7:
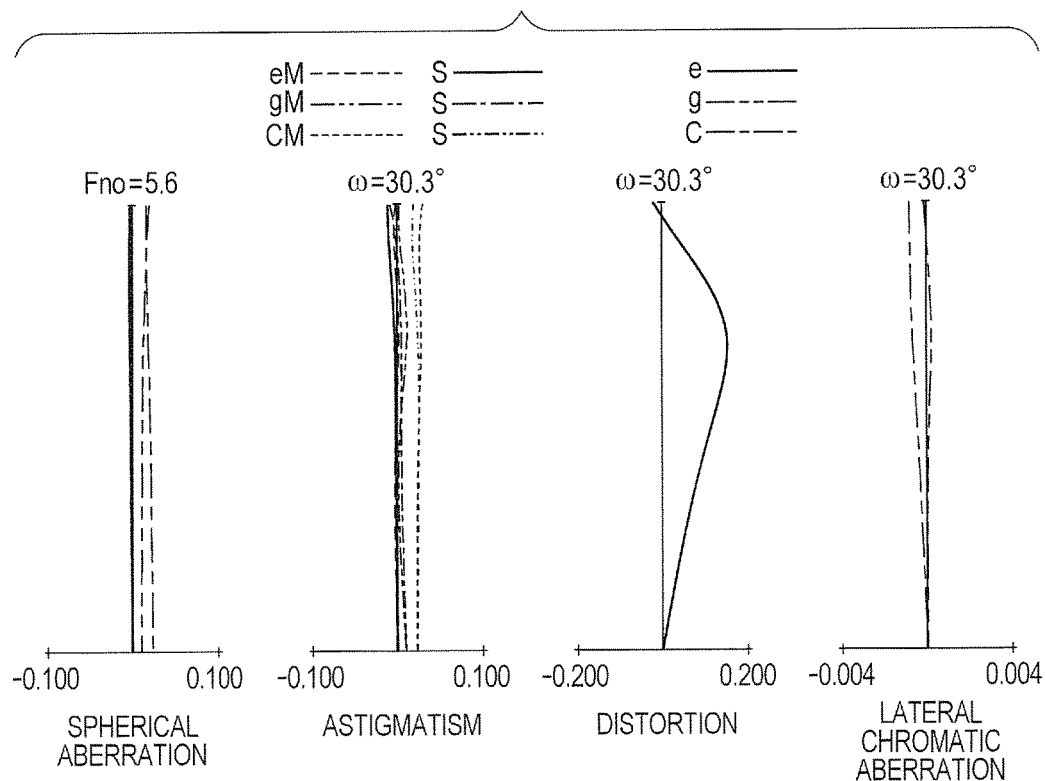
FIG. 7 is a diagram illustrating various aberrations of the scanning lens unit of Numerical Example 2 of the first embodiment.
Figure 8:
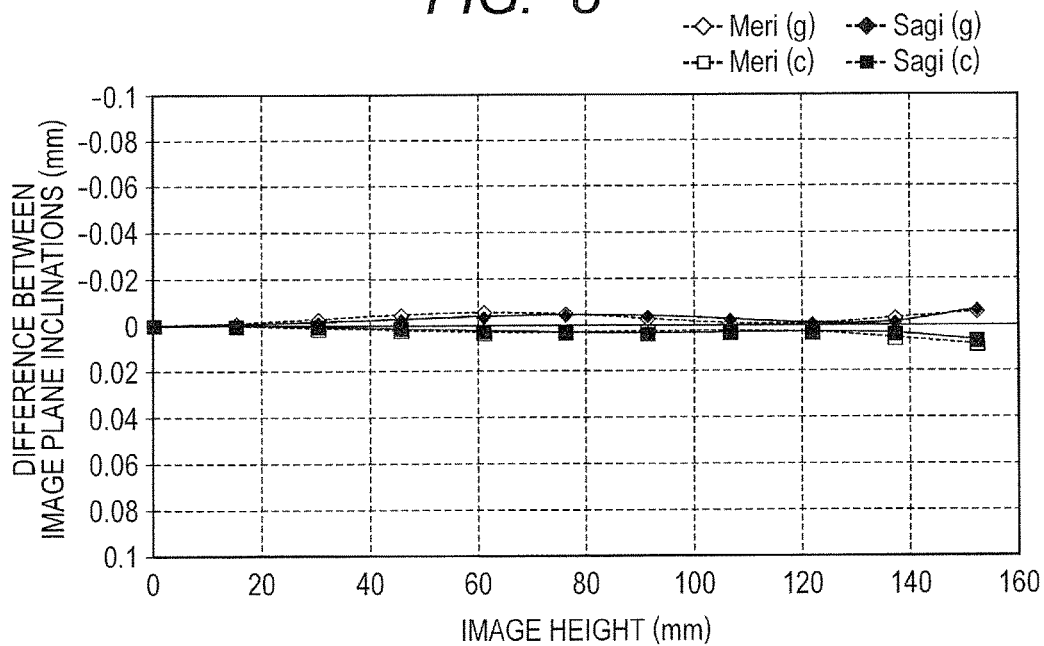
FIG. 8 is a diagram illustrating image-height dependencies of differences between image plane inclinations of colors in the scanning lens unit of Numerical Example 2 of the first embodiment.
Figure 9:
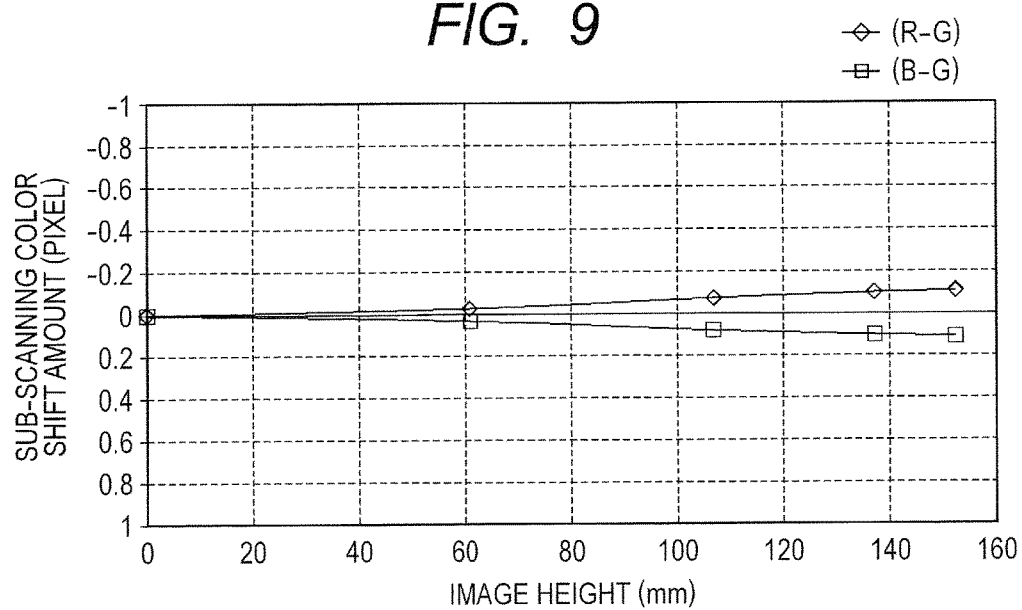
FIG. 9 is a diagram illustrating image-height dependencies of the sub-scanning color shift amounts between colors in the scanning lens unit of Numerical Example 2 of the first embodiment.

FIG. 6 is a cross-sectional view of lenses in the scanning lens unit 3 in Numerical Example 2. FIG. 7 illustrates various aberrations of the scanning lens unit 3 in Numerical Example 2. FIG. 8 illustrates image-height dependencies of differences between an image plane inclination of each of R and B colors and that of G color in the scanning lens unit 3 in Numerical Example 2. FIG. 9 illustrates image-height dependencies of the sub-scanning color shift amounts of R and B colors from G color in the scanning lens unit 3 in Numerical Example 2.

Figure 10:
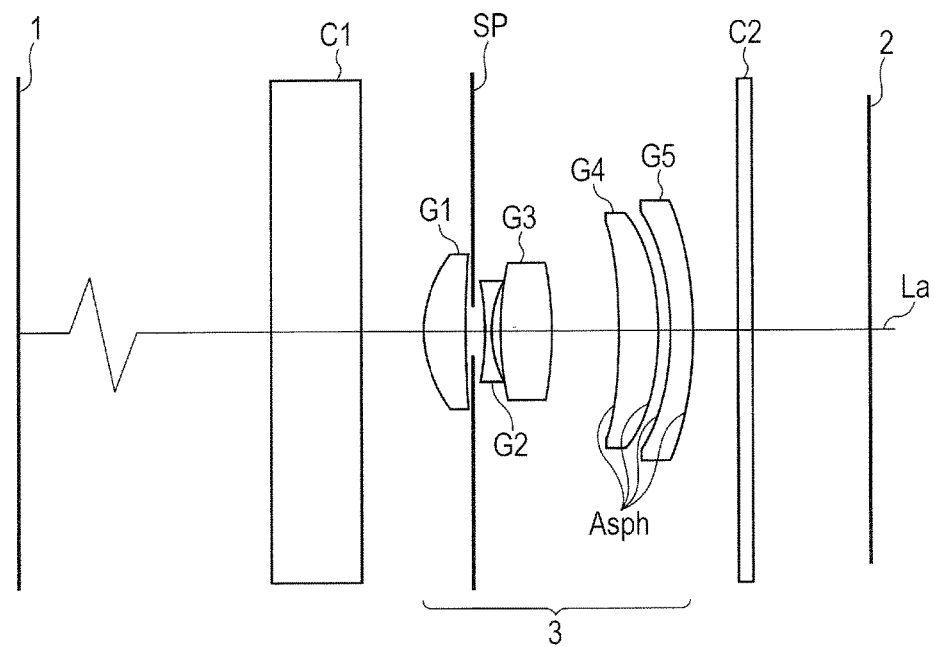
FIG. 10 is a cross-sectional view of lenses in the scanning lens unit of Numerical Example 3 of the first embodiment.
Figure 11:
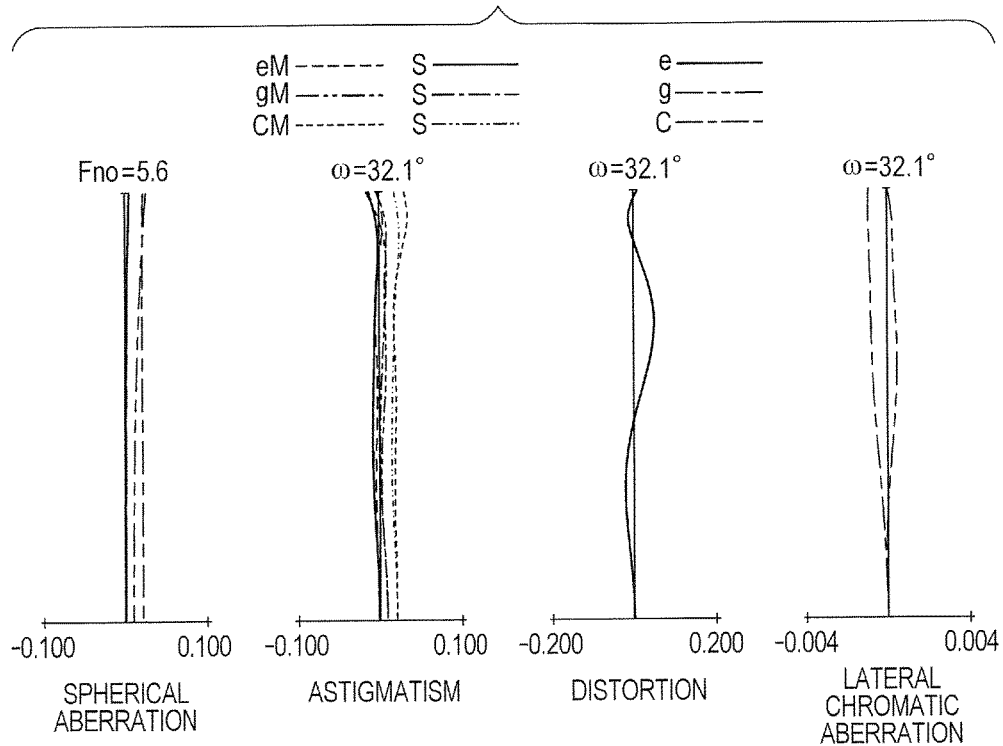
FIG. 11 is a diagram illustrating various aberrations of the scanning lens unit of Numerical Example 3 of the first embodiment.
Figure 12:
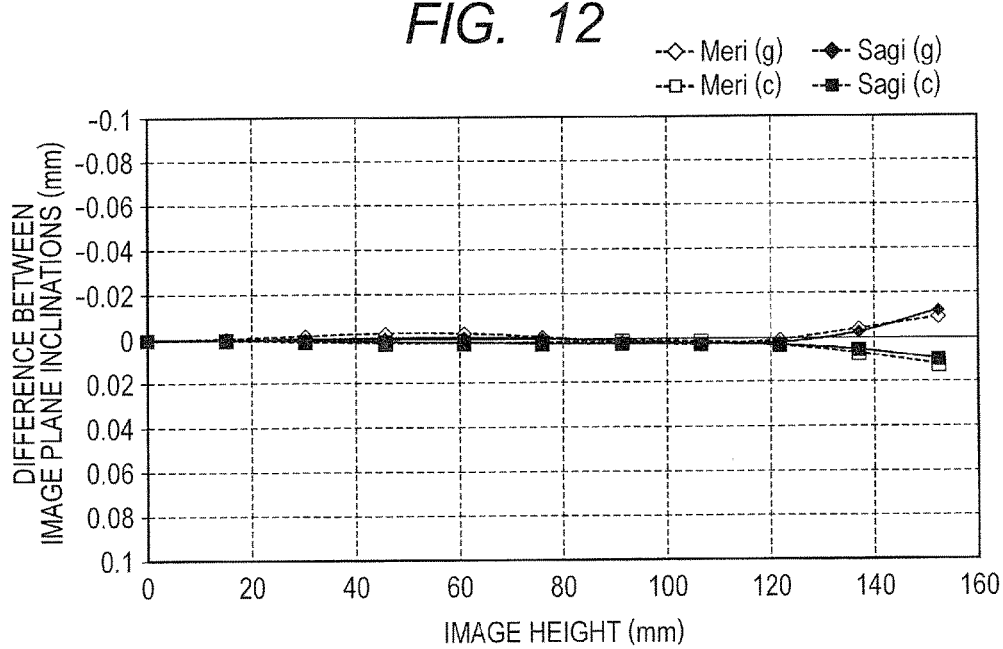
FIG. 12 is a diagram illustrating image-height dependencies of differences between image plane inclinations of colors in the scanning lens unit of Numerical Example 3 of the first embodiment.
Figure 13:
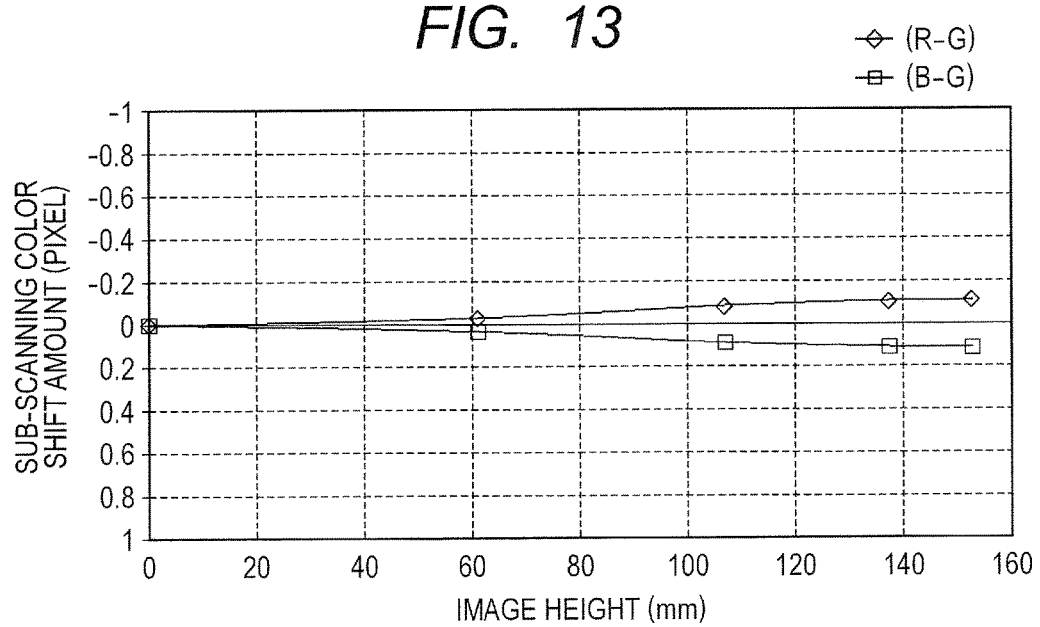
FIG. 13 is a diagram illustrating image-height dependencies of the sub-scanning color shift amounts between colors in the scanning lens unit of Numerical Example 3 of the first embodiment.

FIG. 10 is a cross-sectional view of lenses in the scanning lens unit 3 in Numerical Example 3. FIG. 11 illustrates various aberrations of the scanning lens unit 3 in Numerical Example 3. FIG. 12 illustrates image-height dependencies of differences between an image plane inclination of each of R and B colors and that of G color in the scanning lens unit 3 in Numerical Example 3. FIG. 13 illustrates image-height dependencies of the sub-scanning color shift amounts of R and B colors from G color in the scanning lens unit 3 in Numerical Example 3.

Figure 14:
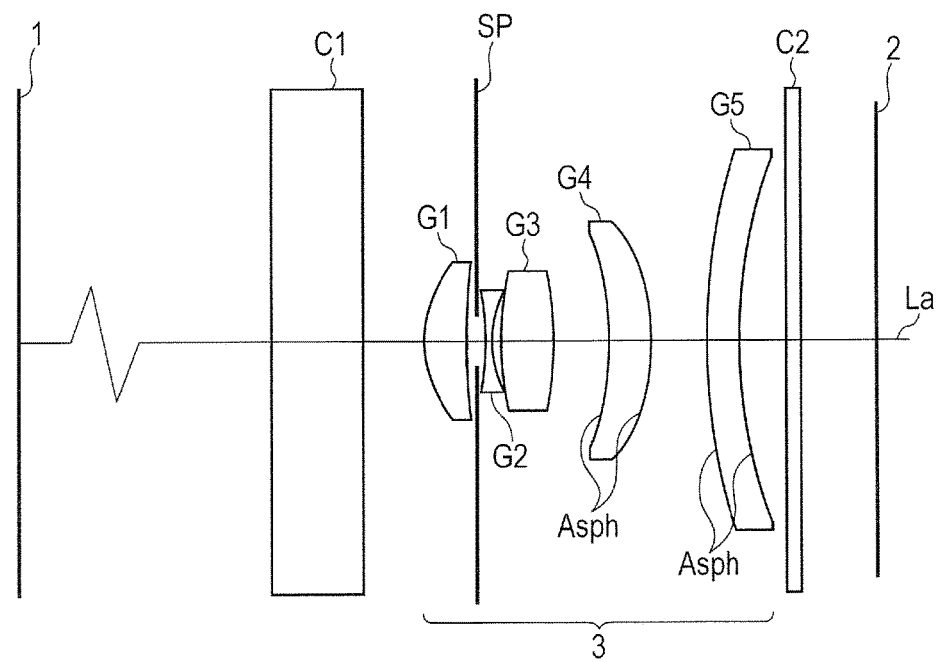
FIG. 14 is a cross-sectional view of lenses in the scanning lens unit of Numerical Example 4 of the first embodiment.
Figure 15:
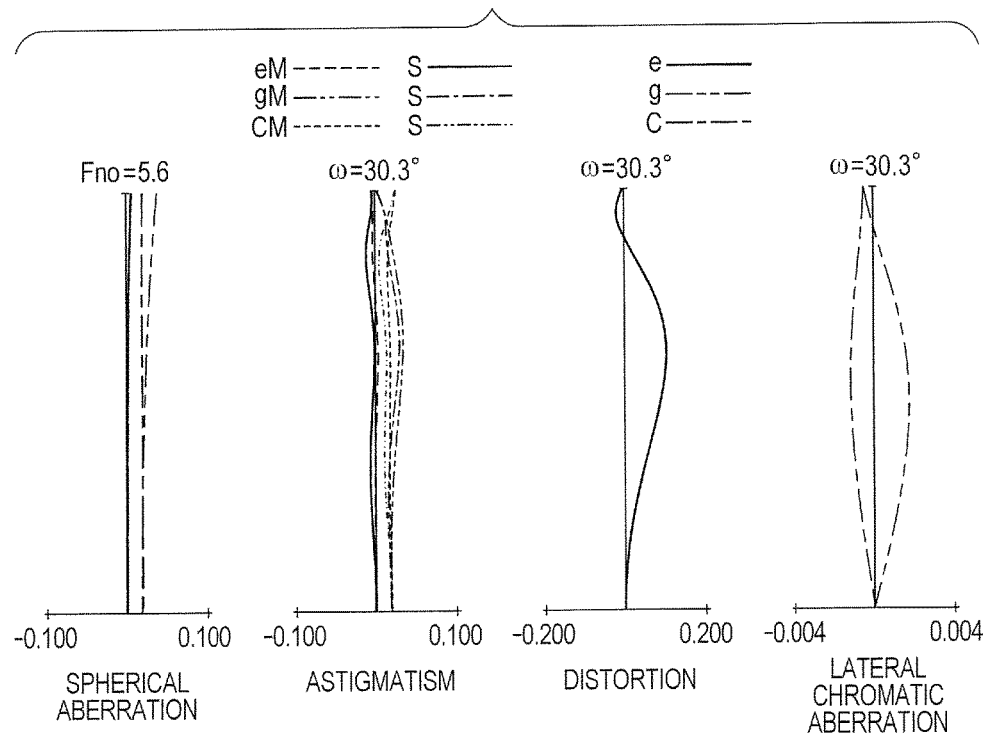
FIG. 15 is a diagram illustrating various aberrations of the scanning lens unit of Numerical Example 4 of the first embodiment.
Figure 16:
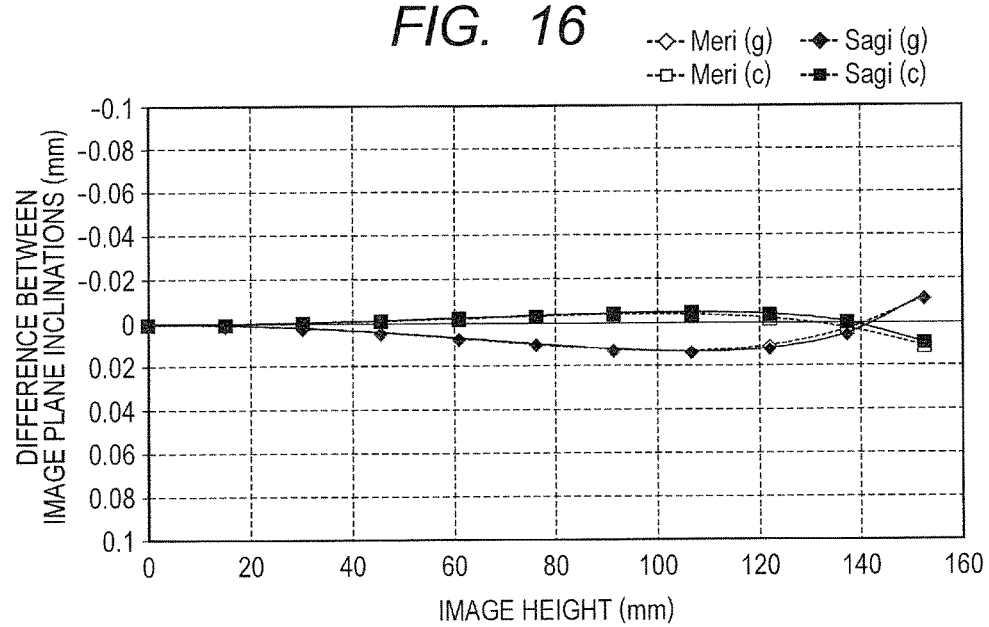
FIG. 16 is a diagram illustrating image-height dependencies of differences between image plane inclinations of colors in the scanning lens unit of Numerical Example 4 of FIG. 17 is a diagram illustrating image-height dependencies of the sub-scanning color shift amounts between colors in the scanning lens unit of Numerical Example 4 of the first embodiment.
Figure 17:
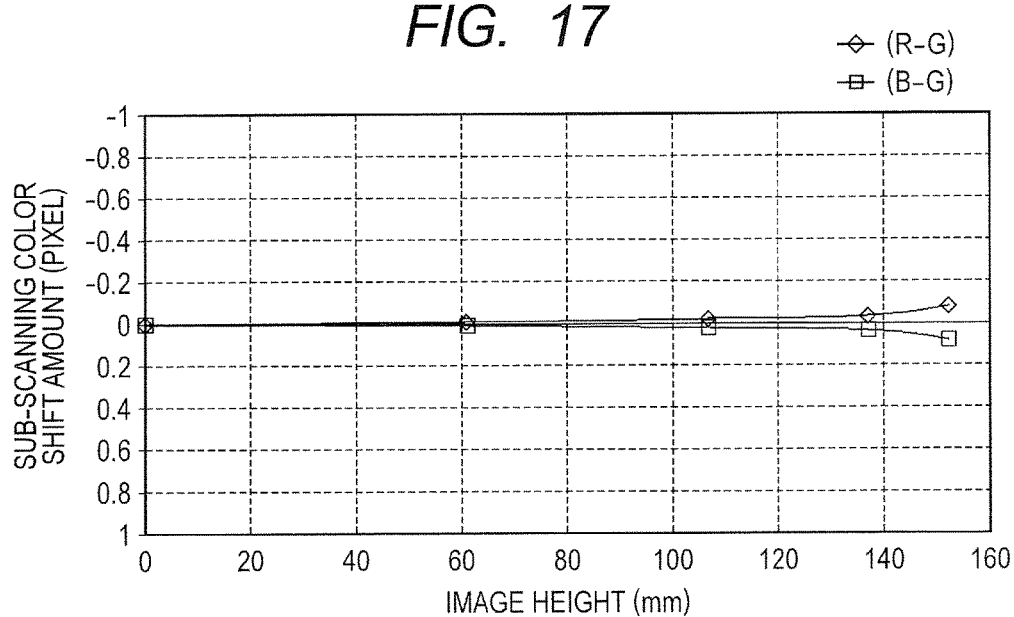

FIG. 14 is a cross-sectional view of lenses in the scanning lens unit 3 in Numerical Example 4. FIG. 15 illustrates various aberrations of the scanning lens unit 3 in Numerical Example 4. FIG. 16 illustrates image-height dependencies of differences between an image plane inclination of each of R and B colors and that of G color in the scanning lens unit 3 in Numerical Example 4. FIG. 17 illustrates image-height dependencies of the sub-scanning color shift amounts of R and B colors from G color in the scanning lens unit 3 in Numerical Example 4.

As shown in FIGS. 2, 6, 10 and 14, the scanning lens units 3 in Numerical Examples 1 to 4 each include a first lens G1, an aperture stop SP, a second lens G2, a third lens G3, a fourth lens G4 and a fifth lens G5. FIGS. 2, 6, 10 and 14 further illustrate a contact glass C1 and a cover glass C2.

FIGS. 3, 7, 11 and 15 each illustrate the spherical aberration, astigmatism, distortion and lateral chromatic aberration of the scanning lens unit. It should be noted that in each drawing, reference signs e, g and C respectively represent an e-line, a g-line and a C-line while reference signs ΔM and ΔS respectively represent a meridional image plane and a sagittal image plane. Incidentally, the lateral chromatic aberration is represented by the g-line and the C-line. Furthermore, reference signs Fno and ω respectively represent an F number and a half angle of view.

FIGS. 4, 8, 12 and 16 each illustrate the image-height dependency of the difference (Meri(C)) of the meridional image plane inclination of the R color (the C-line) to that of the G color (the e-line), and the image-height dependency of the difference (Meri(g)) of the meridional image plane inclination of the B color (the g-line) to that of the G color. Furthermore, FIGS. 4, 8, 12 and 16 each illustrate the image-height dependency of the difference (Sagi(C)) of the sagittal image plane inclination of the R color to that of the G color, and the image-height dependency of the difference (Sagi(g)) of the sagittal image plane inclination of the B color to that of the G color.

FIGS. 5, 9, 13 and 17 each illustrate the image-height dependency of the sub-scanning color shift amount (R-G) due to a sub-scanning magnification deviation of the R color from the G color, and the image-height dependency of the sub-scanning color shift amount (B-G) due to a sub-scanning magnification deviation of the B color from the G color.

As shown in FIGS. 2, 6, 10 and 14, in order from an original 1 side (an object side) to reading unit 2 side (an image side), the scanning lens units 3 in Numerical Examples 1 to 4 each include: the meniscus first lens G1 whose convex surface faces the original 1, and which has a positive refractive power; the aperture stop SP; the second lens G2 both of whose lens surfaces are concave; the third lens G3 both of whose lens surfaces are convex; the meniscus fourth lens G4 whose convex surface faces the reading unit 2; and the meniscus fifth lens G5.

The fourth lens G4 (a first optical element) and the fifth lens G5 (a second optical element) are adjacent to each other, and are made of different materials. Each of the fourth and fifth lenses G4, G5 is a special aspherical lens having at least one special aspherical surface Asph.

Figure 18:
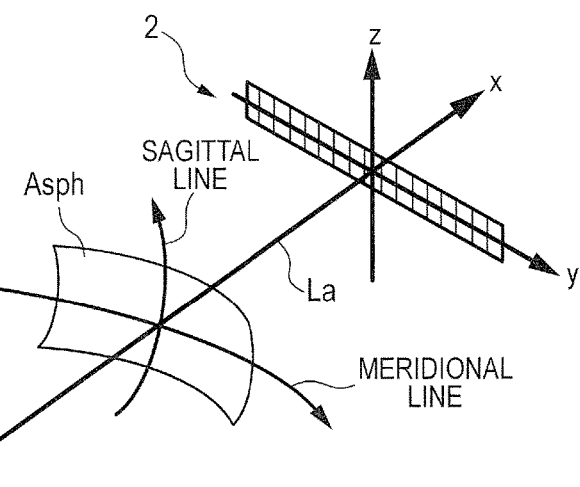
FIG. 18 is a diagram illustrating a special aspherical surface of a special aspherical lens included in the scanning lens unit in the first embodiment.

FIG. 18 is a diagram illustrating the special aspherical surface Asph of the special aspherical lens included in the scanning lens unit 3 in the embodiment.

As illustrated in FIG. 18, a meridional line is defined as a line on the special aspherical surface Asph in a main scanning cross section (an xy cross section, a second cross section) taken in parallel to the optical axis La (the x direction) and the array direction of the scanning pixels in the line sensors included in the reading unit 2 (the main scanning direction, the y direction). Incidentally, the optical axis La is determined by the first lens G1 to the third lens G3 whose lens surfaces are rotationally symmetric with respect to the optical axis.

Furthermore, as illustrated in FIG. 18, a sagittal line is defined as a line on the special aspherical surface Asph in a sub-scanning cross section (an xz cross section, and a first cross section) which includes the optical axis La, and which is perpendicular to the main scanning cross section.

Here, on the special aspherical surface Asph of the special aspherical lens included in the scanning lens unit 3 in the embodiment, the curvature of the meridional line on the optical axis La and the curvature of the sagittal line on the optical axis La are equal to each other.

In addition, the curvature of the sagittal line of the special aspherical surface Asph continuously changes as the sagittal line becomes farther from the optical axis La in the main scanning direction, namely from the on-axis image height to the most off-axis image height in the main scanning direction.

Incidentally, the curvature of the meridional line is a curvature at an arbitrary point on the meridional line in the main scanning cross section.

Meanwhile, the curvature of the sagittal line is a curvature at an arbitrary point on the sagittal line in the sub-scanning cross section which is at an arbitrary point on the meridional line.

The fourth and fifth lenses G4, G5 which are the special aspherical lenses included in the scanning lens unit 3 in the embodiment are made of resin. That is because the cost reduction is achieved by forming the fourth and fifth lenses G4, G5 using the resin. Otherwise, the cost would increase because the special aspherical shapes of the fourth and fifth lenses G4, G5 are complicated; and the lens diameters of the fourth and fifth lenses G4, G5 tend to become larger than those of the other lenses in the scanning lens unit 3.

In addition, the aperture stop SP included in the scanning lens unit 3 in the embodiment is set such that the vignetting factor of the light flux incident on the scanning lens unit 3 is 95% or greater throughout all the image heights.

Next, specific numerical values in Numerical Examples 1 to 4 of the scanning lens unit 3 of the embodiment will be given in Tables 1 to 8.

Tables 1, 3, 5 and 7 each show numerical values of the lens shape of each lens in Numerical Examples 1 to 4 of the scanning lens unit 3 of the embodiment.

In Tables 1, 3, 5 and 7, Surface Number i represents the number which refers to the position of each surface in series from the original 1 side; R represents the curvature radius of each surface; D represents the thickness of a member between the i-th surface and the (i+1)-th surface, or the air distance between the i-th surface and the (i+1)-th surface; and Nd and νd respectively represent the refractive index and the Abbe number obtained by using the d-line as a reference.

Furthermore, in Tables 1, 3, 5 and 7, f, Fno, β, Y and ω respectively represent the focal length, F number, magnification, largest image height and half angle of view of the scanning lens unit 3.

Tables 2, 4, 6 and 8 each show aspherical coefficients representing the aspherical shape of the special aspherical surface in Numerical Examples 1 to 4 of the scanning lens unit 3 of the embodiment.

Here, the shape X of the meridional line of the special aspherical surface is expressed with the expression (1) given below, when the origin is defined as an intersection point between the special aspherical surface and the optical axis; the x axis is defined as the direction of the optical axis; the y axis is defined as an axis orthogonal to the optical axis in the main scanning cross section; and the z axis is defined as an axis orthogonal to the optical axis in the sub-scanning cross section:

$$X = \frac{\frac{y^2}{R}}{1+\sqrt{1-(1+k_y)\left(\frac{y}{R}\right)^2}} + B_4 y^4 + B_6 y^6 + B_8 y^8 + B_{10} y^{10}, \quad (1)$$

where R represents the on-axis curvature radius; and $k_y$, $B_4$, $B_6$, $B_8$ and $B_{10}$ each represent an aspherical surface coefficient.

In addition, the shape S of the sagittal line of the special aspherical surface (the amount of sag of the curvature radius on the optical axis relative to the reference shape in a direction parallel to the optical axis of the lens) is expressed with the expression (2) given below:

$$S = \frac{\frac{z^2}{r'}}{1 + \sqrt{1 - (1+K_z)\left(\frac{z}{r'}\right)^2}} + \sum D_i z^i + \sum\sum M_{j\_k} y^j z^k, \quad (2)$$

where r' represents the curvature radius; and $K_z$, $D_i$ and $M_{j\_k}$ (i=4, 6, 8, 10; j=2, 4, 6, 8, 10; k=2, 4, 6, 8) each represent an aspherical surface coefficient.

Furthermore, the curvature radius r' is expressed with the expression (3) given below:

$$1/r' = 1/r_0 + E_2 Y^2 + E_4 Y^4 + E_6 Y^6 + E_8 Y^8 + E_{10} Y^{10} \quad (3),$$

where $r_0$ represents the curvature radius on the optical axis; and $E_2$, $E_4$, $E_6$, $E_8$ and $E_{10}$ each represent an aspherical surface coefficient.

TABLE 1

| Surface | | R | D | Nd | vd |
|---|---|---|---|---|---|
| C1 | | ∞ | 3.90 | 1.516 | 64.1 |
| | | ∞ | | | |
| G1 | 1 | 5.219 | 1.83 | 1.603 | 60.6 |
| | 2 | 39.131 | 0.42 | | |
| SP | 3 | ∞ | 0.29 | | |
| G2 | 4 | −17.940 | 0.30 | 1.640 | 34.5 |
| | 5 | 5.503 | 0.22 | | |
| G3 | 6 | 13.570 | 2.18 | 1.772 | 49.6 |
| | 7 | −19.099 | 2.46 | | |
| G4 | 8 | −77.945 | 1.92 | 1.530 | 55.8 |
| | 9 | −13.105 | 1.09 | 1.583 | 30.2 |
| G5 | 10 | −18.590 | | | |
| C2 | | ∞ | 0.55 | 1.516 | 64.1 |
| | | ∞ | | | |

| | |
|---|---|
| f | 14.79 mm |
| Fno | 5.6 |
| β | −0.055 |
| Y | 152 mm |
| ω | 30.4° |

TABLE 2

| | Eighth Surface | Tenth Surface |
|---|---|---|
| R | −7.79E+01 | −1.86E+01 |
| ky | −1.51E+03 | 1.23E+00 |
| B4 | −8.00E−04 | −1.39E−04 |
| B6 | 4.24E−05 | −2.49E−06 |
| B8 | −1.28E−06 | 1.35E−07 |
| B10 | 3.13E−08 | −7.77E−10 |
| $r_0$ | −7.79E+01 | −1.86E+01 |
| Kz | −1.51E+03 | 1.23E+00 |
| D4 | −8.00E−04 | −1.39E−04 |
| D6 | 4.24E−05 | −2.49E−06 |
| D8 | −1.28E−06 | 1.35E−07 |
| D10 | 3.13E−08 | −7.77E−10 |
| E2 | −4.85E−03 | −1.18E−03 |
| E4 | 1.96E−04 | −4.47E−05 |
| E6 | −4.96E−05 | −2.65E−06 |
| E8 | 3.53E−06 | −1.33E−07 |
| E10 | −2.20E−08 | 1.11E−08 |
| M2_4 | −3.31E−03 | −2.23E−03 |

TABLE 2-continued

| | Eighth Surface | Tenth Surface |
|---|---|---|
| M4_4 | −6.98E−05 | −6.53E−06 |
| M6_4 | −3.00E−05 | 2.62E−06 |
| M8_4 | 2.34E−06 | −6.30E−08 |

TABLE 3

| Surface | | R | D | Nd | vd |
|---|---|---|---|---|---|
| C1 | | ∞ | 3.90 | 1.516 | 64.1 |
| | | ∞ | | | |
| G1 | 1 | 5.252 | 1.86 | 1.603 | 60.6 |
| | 2 | 57.363 | 0.30 | | |
| SP | 3 | ∞ | 0.35 | | |
| G2 | 4 | −17.595 | 0.30 | 1.640 | 34.5 |
| | 5 | 5.521 | 0.23 | | |
| G3 | 6 | 13.848 | 2.14 | 1.786 | 44.2 |
| | 7 | −20.810 | 2.64 | | |
| G4 | 8 | −107.066 | 1.86 | 1.530 | 55.8 |
| | 9 | −12.606 | 0.86 | 1.583 | 30.2 |
| G5 | 10 | −21.216 | | | |
| C2 | | ∞ | 0.55 | 1.516 | 64.1 |
| | | ∞ | | | |

| | |
|---|---|
| f | 14.83 mm |
| Fno | 5.6 |
| β | −0.055 |
| Y | 152 mm |
| ω | 30.3° |

TABLE 4

| | Eighth Surface | Ninth Surface | Tenth Surface |
|---|---|---|---|
| R | −1.07E+02 | −1.26E+01 | −2.12E+01 |
| ky | −1.79E+03 | −2.84E+00 | 3.56E+00 |
| B4 | −9.30E−04 | 4.24E−04 | −2.30E−04 |
| B6 | 1.47E−05 | −9.46E−05 | −9.00E−06 |
| B8 | −1.01E−06 | 3.99E−06 | 2.42E−09 |
| B10 | 6.00E−08 | −7.80E−08 | 4.79E−09 |
| $r_0$ | −1.07E+02 | −1.26E+01 | −2.12E+01 |
| Kz | −1.79E+03 | −2.84E+00 | 3.56E+00 |
| D4 | −9.30E−04 | 4.24E−04 | −2.30E−04 |
| D6 | 1.47E−05 | −9.46E−05 | −9.00E−06 |
| D8 | −1.01E−06 | 3.99E−06 | 2.42E−09 |
| D10 | 6.00E−08 | −7.80E−08 | 4.79E−09 |
| E2 | 8.91E−04 | 1.08E−02 | 3.57E−03 |
| E4 | −6.41E−05 | −5.07E−04 | −1.19E−04 |
| E6 | −4.11E−05 | −7.15E−05 | −1.33E−05 |
| E8 | 5.03E−06 | 9.34E−06 | 9.67E−07 |
| E10 | −1.49E−07 | −2.58E−07 | −1.65E−08 |
| M2_4 | −4.98E−04 | −1.57E−04 | −6.14E−04 |
| M4_4 | 9.58E−05 | −1.97E−04 | 3.58E−05 |
| M6_4 | −1.43E−05 | 3.75E−05 | −9.29E−07 |
| M8_4 | 6.23E−07 | −1.99E−06 | −3.61E−08 |

TABLE 5

| Surface | | R | D | Nd | vd |
|---|---|---|---|---|---|
| C1 | | ∞ | 3.90 | 1.516 | 64.1 |
| | | ∞ | | | |
| G1 | 1 | 5.226 | 1.93 | 1.603 | 60.6 |
| | 2 | 456.496 | 0.29 | | |
| SP | 3 | ∞ | 0.19 | | |
| G2 | 4 | −14.418 | 0.30 | 1.640 | 34.5 |
| | 5 | 5.729 | 0.23 | | |
| G3 | 6 | 15.595 | 2.06 | 1.786 | 44.2 |
| | 7 | −17.488 | 2.85 | | |
| G4 | 8 | −207.394 | 1.80 | 1.530 | 55.8 |
| | 9 | −11.990 | 0.43 | | |

TABLE 5-continued

| | | | | | |
|---|---|---|---|---|---|
| G5 | 10 | −11.631 | 1.02 | 1.583 | 30.2 |
| | 11 | −22.990 | | | |
| C2 | | ∞ | 0.55 | 1.516 | 64.1 |
| | | ∞ | | | |

| | |
|---|---|
| f | 13.80 mm |
| Fno | 5.6 |
| β | −0.055 |
| Y | 152 mm |
| ω | 32.1° |

TABLE 6

| | Eighth Surface | Ninth Surface | Tenth Surface | Eleventh Surface |
|---|---|---|---|---|
| R | −2.07E+02 | −1.40E+01 | −1.36E+01 | −2.30E+01 |
| ky | 7.99E+01 | 3.17E+04 | 5.38E+05 | 3.37E+00 |
| B4 | −8.70E−04 | 3.93E−04 | 4.23E−04 | −2.32E−04 |
| B6 | 1.51E−05 | −9.66E−05 | −9.23E−05 | −7.51E−06 |
| B8 | −2.43E−06 | 4.10E−06 | 3.91E−06 | 6.33E−08 |
| B10 | 7.59E−08 | −9.93E−08 | −7.46E−08 | 1.30E−09 |
| $r_0$ | −2.07E+02 | −1.40E+01 | −1.36E+01 | −2.30E+01 |
| Kz | 7.99E+01 | 3.17E+04 | 5.38E+05 | 3.37E+00 |
| D4 | −8.70E−04 | 3.93E−04 | 4.23E−04 | −2.32E−04 |
| D6 | 1.51E−05 | −9.66E−05 | −9.23E−05 | −7.51E−06 |
| D8 | −2.43E−06 | 4.10E−06 | 3.91E−06 | 6.33E−08 |
| D10 | 7.59E−08 | −9.93E−08 | −7.46E−08 | 1.30E−09 |
| E2 | 4.84E−04 | 1.13E−02 | 1.95E−02 | 1.15E−02 |
| E4 | −5.35E−04 | −5.94E−04 | −5.90E−04 | −2.23E−04 |
| E6 | 4.03E−05 | −6.58E−05 | −8.75E−05 | −3.10E−05 |
| E8 | 5.59E−06 | 1.25E−05 | 7.21E−06 | 7.07E−07 |
| E10 | −2.80E−07 | −3.91E−07 | −1.80E−07 | 9.56E−10 |
| M2_4 | −3.81E−05 | 1.92E−03 | 2.05E−03 | −2.44E−04 |
| M4_4 | −1.77E−04 | −3.91E−04 | −2.58E−04 | 2.35E−05 |
| M6_4 | 2.52E−05 | 3.64E−05 | 2.33E−05 | 4.01E−07 |
| M8_4 | −1.72E−06 | −1.98E−06 | −1.22E−06 | −6.79E−08 |

TABLE 7

| | Surface | R | D | Nd | vd |
|---|---|---|---|---|---|
| C1 | | ∞ | 3.90 | 1.516 | 64.1 |
| | | ∞ | | | |
| G1 | 1 | 5.219 | 1.83 | 1.603 | 60.6 |
| | 2 | 39.131 | 0.42 | | |
| SP | 3 | ∞ | 0.29 | | |
| G2 | 4 | −17.940 | 0.30 | 1.640 | 34.5 |
| | 5 | 5.503 | 0.22 | | |
| G3 | 6 | 13.570 | 2.18 | 1.772 | 49.6 |
| | 7 | −19.099 | 2.46 | | |
| G4 | 8 | −30.791 | 1.76 | 1.530 | 55.8 |
| | 9 | −14.890 | 2.34 | | |
| G5 | 10 | 20.596 | 1.39 | 1.583 | 30.2 |
| | 11 | 17.499 | | | |
| C2 | | ∞ | 0.55 | 1.516 | 64.1 |
| | | ∞ | | | |

| | |
|---|---|
| f | 14.78 mm |
| Fno | 5.6 |
| β | −0.055 |
| Y | 152 mm |
| ω | 30.3° |

TABLE 8

| | Eight Surface | Ninth Surface | Tenth Surface | Eleventh Surface |
|---|---|---|---|---|
| R | −3.08E+01 | −1.49E+01 | 2.06E+01 | 1.75E+01 |
| ky | 6.26E+00 | 3.50E+00 | −9.25E+00 | −2.13E+00 |
| B4 | −1.23E−03 | −6.37E−04 | 2.98E−05 | −5.19E−05 |
| B6 | 2.05E−05 | 1.23E−06 | −5.05E−06 | −3.95E−06 |
| B8 | −4.17E−06 | −1.25E−06 | 1.20E−07 | 9.46E−08 |
| B10 | 1.73E−07 | 2.36E−08 | −7.92E−10 | −5.36E−10 |
| $r_0$ | −3.08E+01 | −1.49E+01 | 2.06E+01 | 1.75E+01 |
| Kz | 6.26E+00 | 3.50E+00 | −9.25E+00 | −2.13E+00 |
| D4 | −1.23E−03 | −6.37E−04 | 2.98E−05 | −5.19E−05 |
| D6 | 2.05E−05 | 1.23E−06 | −5.05E−06 | −3.95E−06 |
| D8 | −4.17E−06 | −1.25E−06 | 1.20E−07 | 9.46E−08 |
| D10 | 1.73E−07 | 2.36E−08 | −7.92E−10 | −5.36E−10 |
| E2 | 4.52E−03 | 4.82E−03 | 5.15E−04 | 4.97E−04 |
| E4 | −5.82E−04 | −1.07E−04 | −2.10E−05 | −2.18E−05 |
| E6 | 8.81E−05 | 9.43E−06 | 8.36E−07 | 7.04E−07 |
| E8 | −2.04E−06 | 1.55E−06 | −1.04E−08 | −6.44E−09 |
| E10 | 1.73E−08 | −5.20E−08 | 0.00E+00 | 0.00E+00 |
| M2_4 | −4.35E−05 | −3.26E−04 | −2.05E−02 | −1.38E−02 |
| M4_4 | 9.91E−05 | 2.88E−04 | 1.48E−03 | 1.71E−03 |
| M6_4 | −2.14E−05 | −3.08E−05 | −6.31E−05 | −5.47E−05 |
| M8_4 | 4.53E−07 | 6.08E−07 | 7.83E−07 | 4.54E−07 |

Next, descriptions will be provided for each conditional expression to be satisfied by the scanning lens unit 3 of the embodiment. The scanning lens unit 3 of the embodiment includes the at least two (a plurality of) special aspherical lenses. Furthermore, at least one surface of each special aspherical lens is the special aspherical surface.

The scanning lens unit 3 of the embodiment satisfies the conditional expression (4) given below:

$$0.4 \leq dst/Td \leq 1.0 \quad (4),$$

where Td represents the total lens length of the scanning lens unit 3; and dst represents the distance between the aperture stop SP and the special aspherical surface closest to the original 1.

The conditional expression (4) is to satisfactorily correct the field curvature, and to satisfactorily reduce the differences between the image plane inclinations of the colors due to the chromatic aberration from the on-axis image height to the off-axis image height.

It is not desirable that dst/Td falls below the lower limit value of the conditional expression (4). That is because the on-axis light ray and the off-axis ray each pass through the special aspherical surface without light flux separation, making it difficult to correct the field curvature, and to reduce the differences between the image plane inclinations of the colors.

Meanwhile, the upper limit value of the conditional expression (4) is corresponds to the largest value of the distance between the aperture stop SP and the special aspherical surface closest to the original 1.

Next, the scanning lens unit 3 of the embodiment satisfies the conditional expression (5) given below:

$$|vst1-vst2| \geq 20 \quad (5),$$

where vst1 represents the Abbe number of the special aspherical lens closest to the original 1; and vst2 represents the Abbe number of the special aspherical lens closest to the reading unit 2.

The conditional expression (5) is to satisfactorily correct the chromatic aberration. It is not desirable that |vst1−vst2| falls below the lower limit value of the conditional expression (5). That is because this makes it difficult to correct the chromatic aberration using the at least two special aspherical lenses.

Next, of the at least two special aspherical lenses included in the scanning lens unit 3 of the embodiment, the on-axis refractive power of the special aspherical lens closest to the original 1 is positive, while the on-axis refractive power of the special aspherical lens closest to the reading unit 2 is negative.

This and the condition defined by the conditional expression (5) make it possible to satisfactorily correct the chromatic aberration using the special aspherical lenses in the scanning lens unit 3 of the embodiment.

Moreover, the scanning lens unit 3 of the embodiment satisfies the conditional expression (6) given below:

$$0.9 \leq (\varphi a2+\varphi b2)/(\varphi a1+\varphi b1) \leq 1.1 \tag{6},$$

where in a cross section (sub-scanning cross section) perpendicular to the main scanning direction, $\varphi a1$ and $\varphi a2$ respectively represent refractive powers of one special aspherical lens at an on-axis principal ray passing position and at the most off-axis principal ray passing position, the special aspherical lens being the closest to the original 1, an on-axis refractive power of the special aspherical lens being positive; and $\varphi b1$ and $\varphi b2$ respectively represent refractive powers of another special aspherical lens at an on-axis principal ray passing position and at the most off-axis principal ray passing position, the special aspherical lens being the closest to the reading unit 2, an on-axis refractive power of the special aspherical lens being negative.

The conditional expression (6) is to satisfactorily reduce the sub-scanning magnification deviation of the scanning lens unit 3 of the embodiment. When $(\varphi a2+\varphi b2)/(\varphi a1+\varphi b1)$ falls below the lower limit value of the conditional expression (6) or exceeds the upper limit value of the conditional expression (6), a difference occurs between a ratio of the total power of the at least two special aspherical lenses at the on-axis image height and a ratio of the total power thereof at the off-axis image height, and thus causes and worsens the sub-scanning magnification deviation.

Next, Numerical Examples 1 to 4 of the scanning lens unit 3 of the embodiment will be examined in details.

Numerical Example 1

As shown in FIG. 2 as well as Tables 1 and 2, the scanning lens unit 3 of Numerical Example 1 includes the fourth lens G4 (third optical element) and the fifth lens G5 (fourth optical element) each of which is the special aspherical lens with a special aspherical surface(s). The fourth lens G4 and the fifth lens G5 are cemented (joined) to each other. An original 1-side lens surface (eighth surface) of the fourth lens G4 and a reading unit 2-side lens surface (tenth surface) of the fifth lens G5 each are a special aspherical surface.

Generally speaking, a special aspherical lens is optically highly sensitive depending on its placement (particularly, parallel decentering, inclination decentering, and the like). However, deterioration in the optical performance of the scanning lens unit 3 due to the placement can be reduced by cementing the fourth lens G4 and the fifth lens G5 to each other.

In addition, as shown in Table 1, the scanning lens unit 3 of Numerical Example 1 has an F number of 5.6 which is necessary and sufficient when the scanning lens unit 3 is used as an image scanner.

Thus, as illustrated in FIG. 3, the various aberrations from the on-axis image height to the off-axis image height are sufficiently reduced. Accordingly, the scanning lens unit 3 obtains a high imaging performance.

Table 9 shows numerical values of the scanning lens unit 3 of Numerical Example 1 which correspond to the conditional expressions (4), (5) and (6). As shown in Table 9, the scanning lens unit 3 of Numerical Example 1 satisfies all of the conditional expressions (4), (5) and (6).

Furthermore, as illustrated in FIG. 4, the difference (Meri (C)) of the meridional image plane inclination of the R color (C-line) to that of the G color (e-line) and the difference (Meri(g)) of the meridional image plane inclination of the B color (g-line) to that of the G color are satisfactorily reduced to a range of −0.02 mm and +0.02 mm throughout all the image heights. Moreover, the difference (Sagi(C)) of the sagittal image plane inclination of the R color to that of the G color and the difference (Sagi(g)) of the sagittal image plane inclination of the B color to that of the G color are also satisfactorily reduced to a range of −0.02 mm and +0.02 mm throughout all the image heights.

Moreover, as illustrated in FIG. 5, the sub-scanning color shift amount (R-G) due to the sub-scanning magnification deviation of the R color from the G color, and the sub-scanning color shift amount (B-G) due to the sub-scanning magnification deviation of the B color from the G color are approximately at 0.15 pixels throughout all the image heights. Accordingly, the scanning lens unit 3 of Numerical Example 1 obtains a sufficient optical performance.

Numerical Example 2

As shown in FIG. 6 as well as Tables 3 and 4, the scanning lens unit 3 of Numerical Example 2 includes the fourth lens G4 (third optical element) and the fifth lens G5 (fourth optical element) each of which is the special aspherical lens with special aspherical surface(s). The fourth lens G4 and the fifth lens G5 are cemented (joined) to each other. An original 1-side lens surface (eighth surface) of the fourth lens G4, an cemented surface (ninth surface) between the fourth lens G4 and the fifth lens G5, as well as a reading unit 2-side lens surface (tenth surface) of the fifth lens G5 each are a special aspherical surface.

Generally speaking, since a special aspherical lens is optically highly sensitive depending on its placement (particularly, parallel decentering, inclination decentering, and the like), deterioration in the optical performance of the scanning lens unit 3 due to the placement can be reduced by cementing the fourth lens G4 and the fifth lens G5 to each other.

In addition, since the joined surface (cemented surface) between the fourth lens G4 and the fifth lens G5 is also the special aspherical surface, the design freedom is increased, and the optical performance can be further enhanced.

In addition, as shown in Table 3, the scanning lens unit 3 of Numerical Example 2 has an F number of 5.6 which is necessary and sufficient when the scanning lens unit 3 is used as an image scanner.

Thus, as illustrated in FIG. 7, the various aberrations from the on-axis image height to the off-axis image height are sufficiently reduced. Accordingly, the scanning lens unit 3 obtains a high imaging performance.

Table 9 shows numerical values of the scanning lens unit 3 of Numerical Example 2 which correspond to the conditional expressions (4), (5) and (6). As shown in Table 9, the scanning lens unit 3 of Numerical Example 2 satisfies all of the conditional expressions (4), (5) and (6).

Furthermore, as illustrated in FIG. 8, the difference (Meri (C)) of the meridional image plane inclination of the R color (C-line) to that of the G color (e-line) and the difference (Meri(g)) of the meridional image plane inclination of the B color (g-line) to that of the G color are satisfactorily reduced to a range of −0.02 mm and +0.02 mm throughout all the image heights. Moreover, the difference (Sagi(C)) of the sagittal image plane inclination of the R color to that of the G color and the difference (Sagi(g)) of the sagittal image plane inclination of the B color to that of the G color are also satisfactorily reduced to a range of −0.02 mm and +0.02 mm throughout all the image heights.

Moreover, as illustrated in FIG. 9, the sub-scanning color shift amount (R-G) due to the sub-scanning magnification deviation of the R color from the G color, and the sub-scanning color shift amount (B-G) due to the sub-scanning magnification deviation of the B color from the G color are approximately at 0.15 pixels throughout all the image heights. Accordingly, the scanning lens unit 3 of Numerical Example 2 obtains a sufficient optical performance.

Numerical Example 3

As shown in FIG. 10 as well as Tables 5 and 6, the scanning lens unit 3 of Numerical Example 3 includes the fourth lens G4 (fifth optical element) and the fifth lens G5 (sixth optical element) each of which is the special aspherical lens with special aspherical surface(s). The fourth lens G4 and the fifth lens G5 are disposed close to (away from) each other. An original 1-side lens surface (eighth surface) of the fourth lens G4, a reading unit 2-side lens surface (ninth surface) of the fourth lens G4, an original 1-side lens surface (tenth surface) of the fifth lens G5, and a reading unit 2-side lens surface (eleventh surface) of the fifth lens G5 each are a special aspherical surface.

For the purpose of further enhancing the design freedom of the scanning lens unit 3 of Numerical Example 3, the fourth lens G4 and the fifth lens G5 each are a single lens, and all the lens surfaces are a special aspherical surface.

Generally speaking, a special aspherical lens is optically highly sensitive depending on its placement (particularly, parallel decentering, inclination decentering, and the like). For this reason, the fourth lens G4 and the fifth lens G5 are disposed as close to each other as possible to adjust, and the angle is made wider by widening the half angle of view at the same time.

Thereby, the scanning lens unit 3 can be further downsized.

In addition, as shown in Table 5, the scanning lens unit 3 of Numerical Example 3 has an F number of 5.6 which is necessary and sufficient when the scanning lens unit 3 is used as an image scanner.

Thus, as illustrated in FIG. 11, the various aberrations from the on-axis image height to the off-axis image height are sufficiently reduced. Accordingly, the scanning lens unit 3 obtains a high imaging performance.

Table 9 shows numerical values of the scanning lens unit 3 of Numerical Example 3 which correspond to the conditional expressions (4), (5) and (6). As shown in Table 9, the scanning lens unit 3 of Numerical Example 3 satisfies all of the conditional expressions (4), (5) and (6).

Furthermore, as illustrated in FIG. 12, the difference (Meri(C)) of the meridional image plane inclination of the R color (C-line) to that of the G color (e-line) and the difference (Meri(g)) of the meridional image plane inclination of the B color (g-line) to that of the G color are satisfactorily reduced to a range of −0.02 mm and +0.02 mm throughout all the image heights. Moreover, the difference (Sagi(C)) of the sagittal image plane inclination of the R color to that of the G color and the difference (Sagi(g)) of the sagittal image plane inclination of the B color to that of the G color are also satisfactorily reduced to a range of −0.02 mm and +0.02 mm throughout all the image heights.

Moreover, as illustrated in FIG. 13, the sub-scanning color shift amount (R-G) due to the sub-scanning magnification deviation of the R color from the G color, and the sub-scanning color shift amount (B-G) due to the sub-scanning magnification deviation of the B color from the G color are approximately at 0.15 pixels throughout all the image heights. Accordingly, the scanning lens unit 3 of Numerical Example 3 obtains a sufficient optical performance.

Numerical Example 4

As shown in FIG. 14 as well as Tables 7 and 8, the scanning lens unit 3 of Numerical Example 4 includes the fourth lens G4 (fifth optical element) and the fifth lens G5 (sixth optical element) each of which is the special aspherical lens with special aspherical surface(s). The fourth lens G4 and the fifth lens G5 are disposed close to (away from) each other. An original 1-side lens surface (eighth surface) of the fourth lens G4, a reading unit 2-side lens surface (ninth surface) of the fourth lens G4, an original 1-side lens surface (tenth surface) of the fifth lens G5, and a reading unit 2-side lens surface (eleventh surface) of the fifth lens G5 each are a special aspherical surface.

In the scanning lens unit 3 of Numerical Example 4, the direction of the meniscus shape of the fifth lens G5 is changed from a shape convex to the reading unit 2 to a shape concave to the reading unit 2. Thus, although the fourth lens G4 and the fifth lens G5 are disposed close to each other, the distance between their special aspherical surfaces can be made large enough. Accordingly, the special aspherical surface effect can be easily exerted in light flux separation.

In this arrangement, too, as shown in Table 7, the scanning lens unit 3 of Numerical Example 4 has an F number of 5.6 which is necessary and sufficient when the scanning lens unit 3 is used as an image scanner.

Thus, as illustrated in FIG. 15, the various aberrations from the on-axis image height to the off-axis image height are sufficiently reduced. Accordingly, the scanning lens unit 3 obtains a high imaging performance.

Table 9 shows numerical values of the scanning lens unit 3 of Numerical Example 4 which correspond to the conditional expressions (4), (5) and (6). As shown in Table 9, the scanning lens unit 3 of Numerical Example 4 satisfies all of the conditional expressions (4), (5) and (6).

Furthermore, as illustrated in FIG. 16, the difference (Meri(C)) of the meridional image plane inclination of the R color (C-line) to that of the G color (e-line) and the difference (Meri(g)) of the meridional image plane inclination of the B color (g-line) to that of the G color are satisfactorily reduced to a range of −0.02 mm and +0.02 mm throughout all the image heights. Moreover, the difference (Sagi(C)) of the sagittal image plane inclination of the R color to that of the G color and the difference (Sagi(g)) of the sagittal image plane inclination of the B color to that of the G color are also satisfactorily reduced to a range of −0.02 mm and +0.02 mm throughout all the image heights.

Moreover, as illustrated in FIG. 17, the sub-scanning color shift amount (R-G) due to the sub-scanning magnification deviation of the R color from the G color, and the sub-scanning color shift amount (B-G) due to the sub-scanning magnification deviation of the B color from the G color are approximately at 0.15 pixels throughout all the image heights. Accordingly, the scanning lens unit 3 of Numerical Example 4 obtains a sufficient optical performance.

Table 9 shows the numerical values of the scanning lens units 3 of Numerical Examples 1 to 4 which correspond to the conditional expressions (4), (5) and (6).

TABLE 9

| | Expression | | Numerical Example 1 | Numerical Example 2 | Numerical Example 3 | Numerical Example 4 |
|---|---|---|---|---|---|---|
| Conditional Expressions (4) | dst/Td | Eighth Surface | 0.51 | 0.54 | 0.56 | 0.41 |
| | | Ninth Surface | | 0.71 | 0.74 | 0.55 |
| | | Tenth Surface | 0.79 | 0.79 | 0.78 | 0.72 |
| | | Eleventh Surface | | | 0.88 | 0.83 |
| Conditional Expression (5) | $|\text{vst1} - \text{vst2}|$ | | 25.6 | 25.6 | 25.6 | 25.6 |
| Conditional Expression (6) | $(\varphi a2 + \varphi b2)/(\varphi a1 + \varphi b1)$ | | 1.00 | 0.97 | 0.90 | 1.08 |

As above, the scanning lens units 3 of Numerical Examples 1 to 4 all have the high imaging performance.

The scanning lens unit 3 of the embodiment is suitable to be used, because the use of the scanning lens unit 3 makes it possible to make the optical path length from the original 1 to the reading unit 2 equal to approximately 280 mm to 300 mm, and thereby to downsize the carriage in the image reading apparatus.

Figure 19A:
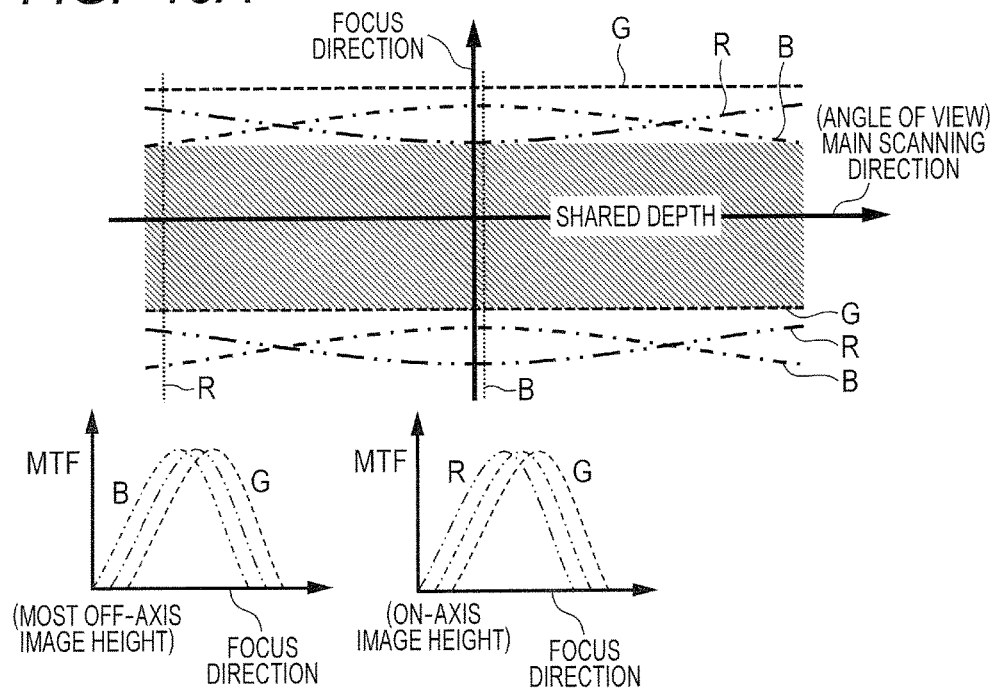
FIG. 19A is a diagram schematically illustrating a depth of field of a conventional scanning lens unit.
Figure 19B:
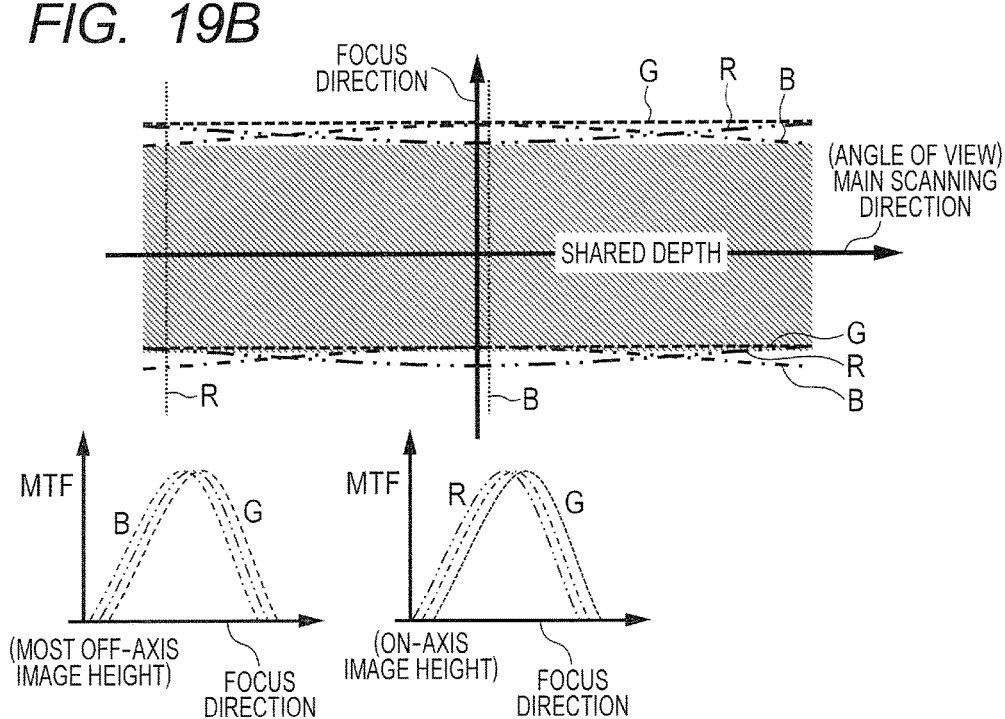
FIG. 19B is a diagram schematically illustrating a depth of field of the scanning lens unit of the embodiments of the present invention.

FIGS. 19A and 19B schematically illustrate the depth of field of a conventional scanning lens unit and the depth of field of the scanning lens unit 3 of the embodiment, respectively.

As illustrated in FIG. 19A, the conventional scanning lens unit is not capable of reducing the differences between the image plane inclination of each of the R and B colors and that of the G color. This decreases the shared depth.

In contrast, as illustrated in FIG. 19B, the scanning lens unit 3 of the embodiment is capable of sufficiently reducing the differences between the image plane inclination of each of the R and B colors and that of the G color as described above. Accordingly, the scanning lens unit 3 of the embodiment is capable of sufficiently securing the shared depth.

As discussed above, the scanning lens unit 3 of the embodiment includes a plurality of special aspherical lenses, at least two of which are made of mutually-different materials, and each of which has at least one special aspherical surface.

In addition, since the scanning lens unit 3 of the embodiment satisfies all of the conditional expressions (4), (5) and (6), the scanning lens unit 3 is capable of satisfactorily reducing the field curvature aberration, and the sub-scanning magnification deviations between the colors, as well as the differences between the image plane inclinations of the colors due to the chromatic aberration in an entire range from the on-axis image height to the off-axis image height.

Furthermore, the embodiment can achieve the scanning lens unit which has a wide angle of view and a high image quality even though having the few five lenses at minimum.

[Image Reading Apparatus]

Figure 20:
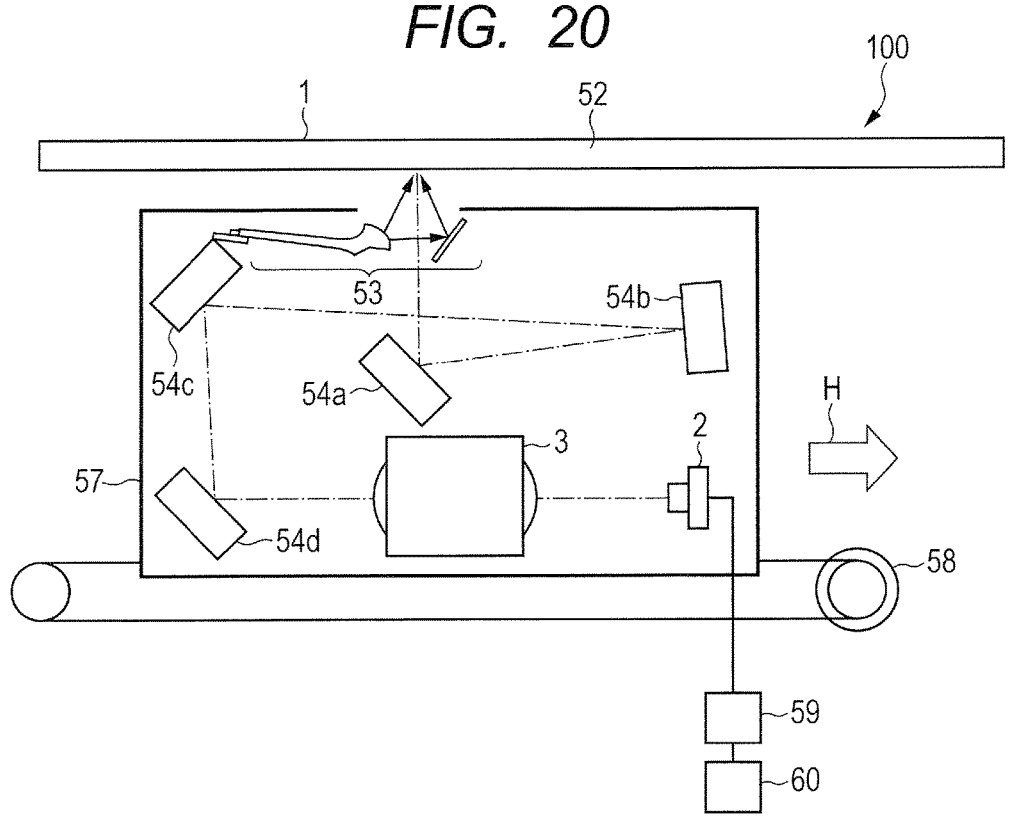
FIG. 20 is a schematic diagram of a main part of an image reading apparatus in which the scanning lens unit of the first embodiment is installed.

FIG. 20 is a schematic diagram of a main part of an image reading apparatus 100 in which the scanning lens unit 3 of any one of Numerical Examples 1 to 4 of the embodiment is installed.

Incidentally, an example of the image reading apparatus 100 is an image reading apparatus such as a carriage-integrated (flatbed) digital copying machine.

In the image reading apparatus 100, a light flux is emitted from an illumination system (illuminating unit) 53. The original 1 placed on an original mounting table (original mounting table glass) 52 is illuminated by the light flux directly or via a light reflector.

The reflected light from the illuminated original 1 is reflected by first, second, third and fourth reflection mirrors 54a, 54b, 54c, and 54d. Thereby, the optical path of the reflected light is bent inside a carriage 57.

Thereafter, the reflected light whose optical path is bent is guided by the scanning lens unit 3 of any one of Numerical Examples 1 to 4 of the above embodiment onto the light receiving surface of the reading unit (light receiving unit) 2 which includes the line sensors (CCD or CMOS sensors).

As a scanning mechanism 58 moves the carriage 57 in a direction indicated with an arrow H, the image information on the original 1 is two-dimensionally read. The thus-read image information is sent to an external apparatus such as a personal computer 60 via an interface 59.

By using the scanning lens unit 3 of any one of Numerical Examples 1 to 4 of the embodiment, the image reading apparatus 100 has achieved a much smaller size with a higher image quality In addition, the scanning lens unit 3 of the embodiment is applicable not only to the carriage-integrated (flatbed) image reading apparatus like the image reading apparatus 100 but also to an image reading apparatus with a 1:2 scanning optical system.

Figure 21:
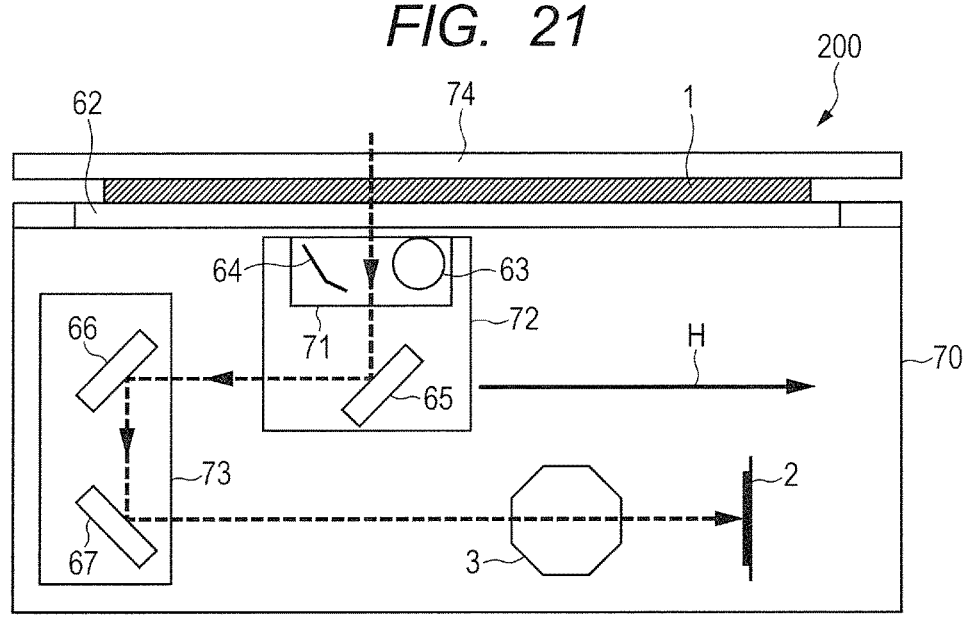
FIG. 21 is a schematic diagram of a main part of an image reading apparatus in which the scanning lens unit of the first embodiment is installed.

FIG. 21 is a schematic diagram of a main part of an image reading apparatus 200 with the 1:2 scanning optical system in which the scanning lens unit 3 of any one of Numerical Examples 1 to 4 of the embodiment is installed.

In the image reading apparatus 200, the original 1 is placed on the surface of an original mounting table (original mounting table glass) 62, and is positioned by a pressure plate 74. The original 1 can be efficiently illuminated by a light flux emitted from an illuminating source 63 directly or by being reflected by a light reflector 64.

Incidentally, examples of the illuminating source 63 include a halogen lamp, a fluorescent lamp, a xenon lamp, and an LED array. In addition, an illuminating unit 71 is formed by the illuminating light source 63 and the light reflector 64.

The reflected light from the illuminated original 1 is reflected by first, second, and third reflection mirrors 65, 66, and 67. Thereby, the optical path of the reflected light is bent inside a main body 70.

Thereafter, based on the image information on the original 1, the reflected light whose optical path is bent is guided by the scanning lens unit 3 of any one of Numerical Examples 1 to 4 of the above embodiment onto the light receiving surface of the reading unit (light receiving unit) 2 which includes the line sensors (CCD or CMOS sensors).

Furthermore, the first reflection mirror 65 is held by a first mirror stand 72, and the second and third mirrors 66, 67 are held by a second mirror stand 73.

The image reading apparatus 200 reads image information on the original 1 by scanning electrically in the main scanning direction while moving the first, second and third reflection mirrors 65, 66, 67 in a direction indicated with an arrow H.

Here, the second and third reflection mirrors 66, 67 move half as much as the first reflection mirror 65 does. This keeps the distance constant between the original 1 and the reading unit 2.

Although the example has been shown where the scanning lens unit 3 of the embodiment is applied to the image reading apparatus such as a digital color copying machine, the application of the scanning lens unit 3 is not limited to this example. The scanning lens unit 3 of the embodiment is also applicable to various color image reading apparatuses such as a color image scanner, for example.

By using special aspherical lenses, the present invention makes it possible to obtain the imaging optical system which is downsized and made capable of, in a satisfactory manner, reducing the field curvature aberration, the sub-scanning magnification deviation, and the chromatic aberration caused by the differences between the image plane inclinations of the colors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-077094, filed Apr. 7, 2016, which is hereby incorporated by reference herein in its entirety.

What is claimed is:

1. An imaging optical system comprising:
    first and second lens elements arranged in order from an object side; and
    an aperture stop, wherein
    each of the first and second lens elements includes an aspherical surface which is rotationally asymmetric with respect to an optical axis,
    a curvature of each of the aspherical surfaces changes along a first direction perpendicular to and intersecting a first cross section including the optical axis, and
    the following conditions are satisfied:

$0.4 \leq dst/Td \leq 1.0$, and $|vst1 - vst2| \geq 20$, where Td represents a distance between a lens surface closest to the object side and a lens surface closest to an image side, dst represents a distance between the aspherical surface closest to the object side and the aperture stop, vst1 represents an Abbe number of the first lens element, and vst2 represents an Abbe number of the second lens element, and
    wherein
    the first lens element has a positive refractive power on the optical axis,
    the second lens element has a negative refractive power on the optical axis, and
    the following condition is satisfied:

$0.9 \leq (\varphi a2 + \varphi b2)/(\varphi a1 + \varphi b1) \leq 1.1$, where in the first cross section, $\varphi a1$ represents a refractive power of the first lens element at an on-axis principal ray passing position, $\varphi a2$ represents a refractive power of the first lens element at a most off-axis principal ray passing position, $\varphi b1$ represents a refractive power of the second lens element at an on-axis principal ray passing position, and $\varphi b2$ represents a refractive power of the second lens element at a most off-axis principal ray passing position.

2. The imaging optical system according to claim 1, wherein on each of the aspherical surfaces, a curvature in the first cross section and the curvature in a second cross section including the optical axis and being parallel to the first direction are equal to each other.

3. The imaging optical system according to claim 1, wherein an object-side surface of the first lens element and an image-side surface of the second lens element both are the aspherical surfaces.

4. The imaging optical system according to claim 1, wherein the first and second lens elements are cemented together.

5. The imaging optical system according to claim 4, wherein a cemented surface at which the first and second lens elements are cemented together is the aspherical surface of each of the first and second lens elements.

6. The imaging optical system according to claim 1, wherein the first and second lens elements are disposed with a space between the first and second lens elements.

7. The imaging optical system according to claim 6, wherein an image-side surface of the first lens element and an object-side surface of the second lens element both are the aspherical surfaces.

8. The imaging optical system according to claim 1, wherein the imaging optical system includes, in order from the object side,
    a meniscus first lens having a convex surface on the object side, and having a positive refractive power,
    the aperture stop,
    a second lens having concave surfaces on both sides,
    a third lens having convex surfaces on both sides,
    a meniscus fourth lens having a convex surface on the image side, and
    a meniscus fifth lens.

9. The imaging optical system according to claim 8, wherein the meniscus fourth lens and the meniscus fifth lens both include the aspherical surfaces.

10. The imaging optical system according to claim 1, wherein the first and second lens elements are formed of resin.

11. The imaging optical system according to claim 1, wherein the aperture stop is set such that a vignetting factor of a light flux incident on the imaging optical system is at 95% or greater throughout all image heights.

12. An image reading apparatus comprising:
    an imaging optical system according to claim 1; and
    a light receiving unit configured to receive a light flux from an object, the light flux condensed by the imaging optical system.

13. The imaging optical system according to claim 1, wherein a focal length of the imaging optical system is fixed.

14. An imaging optical system comprising, in order from an object side:
    a first lens element which is a meniscus lens having a convex surface on the object side, and having a positive refractive power on an optical axis,
    an aperture stop, a second lens element having concave surfaces on both sides,
a third lens element having convex surfaces on both sides,
a fourth lens element which is a meniscus lens having a convex surface on an image side, and
a fifth lens element which is a meniscus lens, wherein
each of the fourth and fifth lens elements includes an aspherical surface which is rotationally asymmetric with respect to the optical axis,
a curvature of each of the aspherical surfaces changes along a first direction perpendicular to and intersecting a first cross section including the optical axis, and
the following conditions are satisfied:

$0.4 \leq dst/Td \leq 1.0$, and $|vst1 - vst2| \geq 20$, where Td represents a distance between a lens surface closest to the object side and a lens surface closest to the image side, dst represents a distance between the aspherical surface closest to the object side and the aperture stop, vst1 represents an Abbe number of the fourth lens element, and vst2 represents an Abbe number of the fifth lens element.

* * * * *